United States Patent [19]

Ohta et al.

[11] Patent Number: 4,659,788

[45] Date of Patent: Apr. 21, 1987

[54] RADIATION CURABLE ADHESIVE COMPOSITION FOR SURFACE PROTECTIVE FILM

[75] Inventors: Tomohisa Ohta; Akihiko Dobashi; Hisashige Kanbara, all of Shimodate; Yasuyuki Seki, Hitachi, all of Japan

[73] Assignee: Hitachi Chemical Co., Ltd., Tokyo, Japan

[21] Appl. No.: 718,290

[22] Filed: Apr. 1, 1985

[30] Foreign Application Priority Data

May 7, 1984 [JP] Japan ................................. 59-90368

[51] Int. Cl.$^4$ .............................................. C08L 61/28
[52] U.S. Cl. ...................................... 525/518; 522/94; 522/105; 522/136; 522/139; 522/144; 522/166; 525/910; 525/920; 525/921
[58] Field of Search ............... 525/518, 910, 920, 921, 525/161; 204/159.21, 159.22; 522/94, 136, 105, 144, 166, 139

[56] References Cited

U.S. PATENT DOCUMENTS 4,172,157 10/1979 Nowak et al. .................. 204/159.21

FOREIGN PATENT DOCUMENTS 27311 2/1980 Japan .
10667 1/1982 Japan .

*Primary Examiner*—Theodore E. Pertilla
*Attorney, Agent, or Firm*—Antonelli, Terry & Wands

[57] ABSTRACT

A radiation curable adhesive composition comprising a liquid oligomer, a chain transfer agent, and an N-methyl compound can give a surface protective film which is slightly influenced in adhesive strength with the lapse of time, and excellent in weather resistance and heat resistance.

6 Claims, No Drawings

RADIATION CURABLE ADHESIVE COMPOSITION FOR SURFACE PROTECTIVE FILM

BACKGROUND OF THE INVENTION

This invention relates to a radiation curable adhesive composition used for surface protective films.

The surface protective films are used for surface protection of metallic plates such as stainless steel plates, aluminum plates and the like, coated metallic plates, resin plates, glass, etc. A characteristic fundamentally required for the films is that when the films are peeled off after being attached to these adherends, the adhesive does not transfer and adhere to the adherends. In order to maintain this property of not transferring and adhering to the adherends, much consideration is required because the surface protective films are often exposed under severe conditions such as high temperatures, exposure to outdoor circumstances and the like between the step of attaching and the step of peeling off. Therefore, as adhesives used in general, there are used those produced by crosslinking a polymer having relatively high molecular weight and viscosity to such a degree that the polymer does not lose its adhesive properties thereby enhancing the cohesion.

On the other hand, as the polymer there is usually used natural rubber, synthetic rubber or the like which should be coated on a substrate in the state of a solution prepared by dissolving it in an organic solvent. However, the production of solventless adhesives is noted from the viewpoint of prevention of environmental pollution, safety, saving resources and saving energy in recent years. As a means to produce a nonsolvent adhesive, radiation curable adhesives utilizing liquid oligomers are particularly noted.

Accordingly, the present inventors have developed a radiation curable adhesive having both cohesion and adhesive properties by adding a chain transfer agent while controlling the amount of unsaturated double bonds in a liquid oligomer having one or more radically crosslinkable unsaturated bonds in its molecule in order to crosslink the oligomer appropriately to enhance the cohesion, and have previously proposed the same (Japanese Patent Appln Kokai (Laid-Open) No. 10667/82).

However, such a radiation curable adhesive was disadvantageous in that since it is used under severe conditions such as high temperatures, outdoor circumstances and the like as mentioned above, its adhesiveness is deteriorated thereby cause the adhesive to transfer and adhere to the adherends.

SUMMARY OF THE INVENTION

Therefore, in order to improve the defects, the present inventors have devoted themselves to research and have consequently found that the object can be achieved by adding a certain N-methylol compound together with a chain transfer agent to the above-mentioned liquid oligomer.

That is to say, an object of this invention is to provide a radiation curable adhesive for surface protective films which undergoes only a slight change of peel strength with the lapse of time after being attached, and is excellent in weather resistance and heat resistance.

According to this invention, such an object can be achieved by exposing to radiation an adhesive composition prepared by blending a liquid oligomer having one or more radically crosslinkable unsaturated double bonds in its molecule which is the main constituent of a radiation curable adhesive, with a chain transfer agent and an N-methylol compound, and thereby conducting crosslinking.

That is to say, this invention provides a radiation curable adhesive composition for surface protective films which comprises 100 parts by weight of a radiation curable liquid oligomer having one or more radically crosslinkable unsaturated double bonds in its molecule, 0.2 to 20 parts by weight of a chain transfer agent, and 0.1 to 20 parts by weight of an N-methylol compound.

DESCRIPTION OF THE PREFERRED EMBODIMENTS

The radiation curable liquid oligomer having one or more unsaturated double bonds in its molecule used in this invention includes oligomers obtained by copolymerizing an acrylic acid alkyl ester or a methacrylic acid alkyl ester as a main chain to a lower degree of polymerization; acrylic oligomers having one or more unsaturated double bonds at terminals or side chains of molecule, such as a polyol acrylate, a polyester acrylate, a urethane acrylate, an epoxy acrylate, etc.; and reactive prepolymers such as polybutadiene, polychloroprene, polyisoprene, etc. Said oligomer is liquid at the normal state and requires no solvent, and only a small amount of a solvent can be added thereto, if used. Further, its viscosity ranges from $10^2$ cps to $5 \times 10^5$ cps at room temperature.

In this invention, oligomers bringing about particularly favorable results are highly reactive oligomers having acryloyl double bonds.

Such liquid oligomers can be synthesized, for example, by the following processes:

(1) A process comprising copolymerizing an acrylic acid ester, a monomer having a carboxylic group, and if necessary, other monomer(s) in a suitable organic solvent by a conventional solution polymerization, and then reacting a part of carboxyl groups of the resulting copolymer with a monomer having an epoxy group in the presence of a polymerization inhibitor and a catalyst to introduce olefinic unsaturated bonds into side chains.

(2) A process comprising copolymerizing an acrylic acid ester, a monomer having an epoxy group, and if necessary, other monomer(s), and reacting a part of epoxy groups of the resulting copolymer with a monomer having a carboxyl group to introduce olefinic unsaturated bonds into side chains.

(3) A process comprising copolymerizing an acrylic acid ester, a monomer having a hydroxyl group, and if necessary, other monomer(s), and reacting a part of hydroxyl groups of the resulting copolymer with a 1:1 addition reaction product (half urethane) of a diisocyanate such as tolylene diisocyanate, hexamethylene diisocyanate, or the like and a monomer having a hydroxyl group to introduce olefinic unsaturated bonds into side chains.

(4) A process of either (1), (2) or (3) described above, wherein a part of the monomer having a carboxyl group in (1), a part of the monomer having an epoxy group in (2), or a part of the monomer having a hydroxyl group in (3) is replaced by a monomer having an amino group.

In some cases, to the radiation curable liquid oligomer, there may be added one or more crosslinkable monomers, and if necessary, one or more adhesion imparting agents, softening agents, antioxidants, fillers, pigments and the like.

The chain transfer agent used in this invention includes thiol compounds such as butyl mercaptan, lauryl mercaptan, 2-ethylhexyl mercaptan, ethylene glycol dithioglycolate, trimethylolpropane tris($\beta$-thiopropionate), pentaerythritol tetrakis($\beta$-thiopropionate) and the like; disulfides such as diphenyl disulfide and the like; and halides such as carbon tetrachloride, carbon tetrabromide, chloroform, dichlorobenzene and the like.

These may be used alone or as a mixture thereof. These chain transfer agents are added in order to suppress excessive crosslinking at the time of radiation curing. For this purpose, the amount thereof used should be selected in the range of 0.2 to 20 parts by weight, preferably 2 to 15 parts by weight per 100 parts by weight of the liquid oligomer. When the amount is less than 0.2 part by weight, the crosslinking-suppressing effect is insufficient, while when it exceeds 20 parts by weight, the curing is insufficient, resulting in insufficient cohesion, so that there are brought about adverse influences on the adhesive properties.

As the N-methylol compound used in this invention as an indispensable constituent, there is a compound having two or more methylol groups or alkyl etherified methylol groups in its molecule.

Concrete examples of the N-methylol compound include amino resin precondensates having two or more methylol groups, such as a melamine-formaldehyde resin precondensate having two or more methylol groups, a urea-formaldehyde resin precondensate having two or more methylol groups, a thiourea-formaldehyde resin precondensate having two or more methylol groups, an aniline-formaldehyde resin precondensate having two or more methylol groups, and the like; and alkyl etherified products of these precondensates. Particularly advantageous compounds are melamine-formaldehyde resin precondensates.

The amount of these N-methylol compounds in the composition is in the range of 0.1 to 20 parts by weight, preferably 0.5 to 10 parts by weight, per 100 parts by weight of the liquid oligomer. When it is less than 0.1 part by weight, only insufficient effect of crosslinking is brought about, while when it exceeds 20 parts by weight, the radiation curable properties and the physical properties of the resulting coating film are lowered. Therefore, both are not preferable.

The term "radiation" in this invention means active energy rays including ionizing radiations such as $\alpha$-rays, $\beta$-rays, $\gamma$-rays, neutron rays and accelerated electron beams, as well as ultraviolet rays. If necessary, the adhesive composition of this invention may contain a curing accelerator.

On exposure to radiation, particular care should be given to the irradiation atmosphere. That is to say, since radicals generated are inhibited by oxygen in the air, the air is, if necessary, replaced by an inert gas such as nitrogen or the like, and it is also possible to cover the film with another film or the like.

This invention is illustrated below by way of the following Examples, in which all parts are by weight.

EXAMPLE 1

Block polymerization of 80 parts of butyl acrylate and 20 parts of glycidyl methacrylate was carried out in the presence of a catalyst of 2,2'-azobisisobutyronitrile at 100° C. for 8 hours to synthesize a solventless acrylic copolymer. Subsequently, 8 parts of acrylic acid was subjected to addition reaction with the copolymer at 120° C. for 20 hours to synthesize a radiation curable liquid acrylic oligomer (viscosity: $5 \times 10^4$ cps at 25°) having unsaturated double bonds at side chains. To 100 parts of the oligomer were added 10 parts of ethylene glycol dithioglycolate as a chain transfer agent and 5 parts of butyl etherified methylolmelamine (Melan 22, a trade name, mfd. by Hitachi Chemical Company, Ltd.) to prepare a radiation curable adhesive. This solventless adhesive was coated, to a thickness of 5 $\mu$m, on a polyethylene film of 60 $\mu$m in thickness whose one side had been subjected to corona treatment. Subsequently, the adhesive was exposed to electron beam at a dose of 4 Mrad from a linear filament type electron beam irradiating apparatus (Electron Curtain, a trade name, mfd. by Energy Science Inc.) at an accelerated voltage of 175 kV and a beam current of 5 mA, under a nitrogen atmosphere (oxygen concentration: 500 ppm) to conduct polymerization and crosslinking. The results of characteristics test on the thus obtained adhesive film for surface protection are shown in Table 1.

EXAMPLE 2

Copolymerization of 10 parts of ethyl acrylate, 75 parts of butyl acrylate and 15 parts of glycidyl methacrylate was carried out, and 8.5 parts of acrylic acid was subjected to addition reaction with the resulting copolymer to synthesize a radiation curable liquid acrylic oligomer in the same method as in Example 1. With 100 parts of the oligomer were mixed 10 parts of carbon tetrabromide and 10 parts of methyl etherified methylolmelamine (Sumimar M-40W, a trade name, mfd. by Sumitomo Chemical Co., Ltd.) to prepare a radiation curable adhesive. The adhesive was exposed to electron beam in the same manner as in Example 1, whereby an adhesive film of polyethylene for surface protection was produced.

Test results obtained for this adhesive film are shown in Table 1.

COMPARATIVE EXAMPLE 1

An adhesive film was produced in the same manner as in Example 1 by using an adhesive having the same composition as that of the adhesive of Example 1 except that 10 parts of ethylene glycol dithioglycolate as a chain transfer agent was omitted.

COMPARATIVE EXAMPLE 2

The same adhesive film as in Example 1 was produced except that there was used the same adhesive as in Example 1 except for omitting 5 parts of Melan 22. Results are shown in Table 1.

COMPARATIVE EXAMPLE 3

An adhesive consisting of 100 parts of acrylic rubber (TOACRON PS-220, a trade name, mfd. by Toa Paint Co., Ltd.) and 5 parts of polyisocyanate (Colonate L, a trade name, mfd. by Nippon Polyurethane Co., Ltd.) was made into a 20% toluene solution, which was coated, as in Example 1, on a polyethylene film of 60 $\mu$m in thickness so as to adjust the thickness of solids to 5 $\mu$m, and then heated and dried at 90° C. for 5 minutes to obtain an adhesive film. Results are shown in Table 1.

TABLE 1

| Example No. | Example 1 | Example 2 | Comparative Example 1 | Comparative Example 2 | Comparative Example 3 |
| --- | --- | --- | --- | --- | --- |
| Initial peel strength*[1] (g/25 mm wide) | 180 | 150 | 200 | 100 | 180 |
| Change of peel strength with the lapse of time*[2] (%) | 105 | 120 | 105 | 130 | 250 |
| Heat resistance*[3] | | | Δ | | |
| Weather resistance*[4] | | | X | Δ | |

Note
*[1]Measured according to JIS C-2107 (adherend: a stainless steel plate of SUS 430 BA)
*[2]An accelerating test on exposure at room temperature and atmosphere was conducted for 7 days under a hot atmosphere at 65° C. and an increasing rate of peel strength was shown in percentage. (The less the increasing rate, the better the adhesive property.)
*[3]After a heat treatment by means of a heat plate press at 80° C. under a pressure of 10 kg/cm² for 24 hours, changes such as transfer and adhesion of each adhesive to the adherend were observed.
*[4]A stainless steel (SUS) plate to which each adhesive film had been attached was exposed in the open in the rooftop of a 3-story building, facing south and inclining at angle of 45°, and the film was peeled off after 6 months, after which transfer and adhesion of the adhesive to the adherend was observed.
 : no transfer and adhesion
Δ: partial transfer and adhesion
X: serious transfer and adhesion As is clear from the results shown in Table 1, the radiation curable adhesives of this invention show excellent cohesion by radiation curing, withstand under severe conditions such as high temperatures, outdoor circumstances, and the like, undergo only a slight change of peel strength with the lapse of time, have excellent characteristics as an adhesive for surface protective films, and hence have a very great industrial value.

What is claimed is:

1. A radiation curable adhesive composition for surface protective films which consists essentially of 100 parts by weight of an acrylic liquid oligomer having one or more acryloyl double bonds at terminal groups or side chains in its molecule, 0.2 to 20 parts by weight of a chain transfer agent selected from the group consisting of a thiol compound, a disulfide and a halide, and 0.2 to 20 parts by weight of an N-methylol compound selected from the group consisting of compounds having two or more methylol groups or alkyl etherified methylol groups in its molecule; said acrylic liquid oligomer having an acrylic acid alkyl ester or a methacrylic acid alkyl ester as a main chain.

2. A composition according to claim 1, wherein the N-methylol compound is selected from the group consisting of amino resin precondensates having two or more N-methylol groups and alkyl etherified products of these amino resin precondensates.

3. A composition according to claim 2, wherein the amino resin precondensate is a melamine-formaldehyde resin precondensate, a urea-formaldehyde resin precondensate, a thiourea-formaldehyle resin precondensate, or an aniline-formaldehyde resin precondensate.

4. A composition according to claim 1, wherein the chain transfer agent is a thiol compound, or a halide, and the N-methylol compound is a melamine-formaldehyde resin precondensate having two or more methylol groups or an alkyl etherified melamine-formaldehyde resin precondensate.

5. A composition according to claim 1, wherein said acrylic liquid oligomer has a viscosity ranging from $10^2$ cps to $5 \times 10^5$ cps at room temperature.

6. A composition according to claim 5, wherein said composition is free of solvent.

* * * * *